United States Patent
Guo et al.

(10) Patent No.: US 9,850,767 B2
(45) Date of Patent: Dec. 26, 2017

(54) ALUMINUM FAN BLADE TIP WITH THERMAL BARRIER

(71) Applicant: UNITED TECHNOLOGIES CORPORATION, Farmington, CT (US)

(72) Inventors: Changsheng Guo, South Windsor, CT (US); Yan Chen, South Windsor, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 525 days.

(21) Appl. No.: 14/711,237

(22) Filed: May 13, 2015

(65) Prior Publication Data

US 2016/0040538 A1 Feb. 11, 2016

Related U.S. Application Data

(60) Provisional application No. 62/035,266, filed on Aug. 8, 2014.

(51) Int. Cl.
| | | |
|---|---|---|
| *F02C 3/04* | (2006.01) | |
| *F01D 5/28* | (2006.01) | |
| *F01D 5/14* | (2006.01) | |
| *B05D 7/14* | (2006.01) | |

(Continued)

(52) U.S. Cl.
CPC ............... *F01D 5/288* (2013.01); *B05D 7/14* (2013.01); *F01D 5/147* (2013.01); *F01D 11/122* (2013.01); *F02K 3/06* (2013.01); *F05D 2230/90* (2013.01); *F05D 2300/611* (2013.01)

(58) Field of Classification Search
CPC ......... B05D 7/14; F01D 11/122; F01D 5/147; F01D 5/288; F02K 3/06; F05D 2230/90; F05D 2300/611
See application file for complete search history.

(56) References Cited

U.S. PATENT DOCUMENTS

| | | | | |
|---|---|---|---|---|
| 4,861,618 A | * | 8/1989 | Vine | C23C 4/02 427/452 |
| 6,180,262 B1 | * | 1/2001 | Freling | C23C 4/02 415/173.1 |

(Continued)

FOREIGN PATENT DOCUMENTS

| | | |
|---|---|---|
| CA | 2653270 | 12/2007 |
| EP | 1813773 | 1/2007 |

(Continued)

OTHER PUBLICATIONS

International Search Report, International Application No./Patent No. 15180274.1-1610/2987958, dated Apr. 25, 2016, European Patent Office; International Search Report 7 pages.

*Primary Examiner* — Jesse Bogue
(74) *Attorney, Agent, or Firm* — Cantor Colburn LLP (57) ABSTRACT

A fan blade for a gas turbine engine is described. The fan blade may comprise a body portion formed from a metallic material, and it may include a suction side, a pressure side, a leading edge, a trailing edge, and a tip. A coating may be applied to the tip, and the coating may have a thermal conductivity of no more than about 10 watt per meter kelvin. The coating may be a thermal barrier coating comprising yttria-stabilized zirconia.

10 Claims, 7 Drawing Sheets

(51) Int. Cl.
*F01D 11/12* (2006.01)
*F02K 3/06* (2006.01)

(56) References Cited

U.S. PATENT DOCUMENTS

| | | | |
|---|---|---|---|
| 2007/0175032 A1* | 8/2007 | Kurt-Elli | F01D 5/16 29/889.21 |
| 2012/0099992 A1* | 4/2012 | Strock | F01D 11/001 416/174 |
| 2014/0010663 A1* | 1/2014 | Parkos, Jr. | F01D 5/147 416/241 R |
| 2015/0166831 A1* | 6/2015 | Kuehneweg | C08G 18/73 428/423.1 |
| 2015/0204347 A1* | 7/2015 | Strock | F04D 29/388 416/229 R |

FOREIGN PATENT DOCUMENTS

| | | |
|---|---|---|
| EP | 2899371 | 7/2015 |
| WO | 2014096839 A1 | 6/2014 |

* cited by examiner

ALUMINUM FAN BLADE TIP WITH THERMAL BARRIER

This Application is a non-provisional patent application claiming priority under 35 USC §119(e) to U.S. Provisional Patent Application Ser. No. 62/035,266 filed on Aug. 8, 2014.

FIELD OF THE DISCLOSURE

The present disclosure generally relates to fan blades in gas turbine engines, and more specifically, relates to aluminum fan blades having thermal barrier coatings.

BACKGROUND

Gas turbine engines are internal combustion engines typically used to provide thrust to an aircraft or to provide power for land-based operations. A turbofan engine is a type of gas turbine engine consisting of a fan section, and a core engine located axially downstream of the fan section and including a compressor section (including a low pressure compressor and a high pressure compressor), one or more combustors, and a turbine section (including a high pressure turbine and a low pressure turbine). Air may be drawn into the engine and accelerated by the rotating blades of the fan, and it may be subsequently routed through the core engine where it may be compressed/pressurized in the compressor section prior to entry into the combustor(s). Once in the combustor(s), the air may be mixed with fuel and combusted to generate hot combustion gases. Energy may be extracted from the combustion gas products in the turbine section to power the rotation of the turbine section. The turbine section may then, in turn, drive the rotation of the compressor section and the fan, as all may be interconnected on one or more shafts. The combustion gas products may then be expelled through an exhaust nozzle to provide aircraft propulsion.

In a two-spool turbofan engine, an inner shaft may connect the fan and the low pressure compressor to the low pressure turbine, and an outer concentric shaft may connect the high pressure compressor to the high pressure turbine. In a geared turbofan engine, the inner shaft may drive the fan at a lower speed than the low pressure compressor and the low pressure turbine through a speed changing device (e.g., a reduction gearbox) to improve engine efficiency.

Some gas turbine engines, such as geared turbofan engines, use aluminum or aluminum alloy based fan blades. The aluminum/aluminum alloy fan blades may have a polyurethane coating to protect the body of the airfoil against corrosion or erosion, as well as a wear-resistant anodized aluminum hard coating applied to the tip of the airfoil to prevent wear of the fan blade tip upon impact with an abradable seal lining the inner surface of the fan case.

Gas turbine engines may be initially assembled with a clearance between the tips of the aluminum/aluminum alloy fan blades and the abradable seal. However, during engine initial break-in, thermal or mechanical forces (e.g., centrifugal forces, etc.) may act on the fan blades causing them to expand, possibly causing the tips of the fan blades to impact or abrade away the abradable seal in an instantaneous "rub event". A rub event may also occur, for example, during take-off, landing, or maneuvering (i.e., sharp turns). Friction-induced heat may be generated at the rub interface between the fan blade tip(s) and the abradable material during a rub event. Given the relatively high thermal conductivities of the aluminum oxide hard coating (about 30-40 watt per meter kelvin) and the aluminum fan blade (about 160 watt per meter kelvin) compared to the abradable seal (may be less than 0.1 watt per meter kelvin), much of the friction-induced heat may be conducted to the hard coating and through the body of the fan blade rather than the abradable seal, causing the temperature of the body of the fan blade to rise. In some cases, the temperature rise through the body of the fan blade may exceed the temperature capability of the polyurethane coating and lead to the melting or delamination of the polyurethane coating.

In an effort to reduce blade tip wear in aluminum fan blades due to rub events, U.S. Patent Application Publication Number 2014/0010663 describes the application of a hard crystalline oxidation layer to the tip of aluminum fan blades. The harder tip disclosed therein was reported to more easily cut into the abradable material, thereby generating less heat as a result of rub events. While effective, additional enhancements that resist heat transfer to aluminum fan blades in gas turbine engines are still wanting.

Clearly, there is a need for systems that reduce heat conduction to aluminum fan blades in gas turbine engines.

SUMMARY OF THE DISCLOSURE

In accordance with one aspect of the present disclosure, a fan blade for a gas turbine engine is disclosed. The fan blade may comprise a body portion formed from a metallic material, and the body portion may include a pressure side, a suction side, a leading edge, a trailing edge, and a tip. The fan blade may further comprise a coating applied to the tip, and the coating may have a thermal conductivity of no more than about 10 watt per meter kelvin.

In another refinement, the metallic material may be aluminum or an aluminum alloy.

In another refinement, the coating may be a thermal barrier coating comprising yttria-stabilized zirconia.

In another refinement, the fan blade may further comprise a polyurethane coating applied to a surface of the body portion.

In another refinement, the fan blade may further comprise an aluminum oxide coating applied over the thermal barrier coating.

In another refinement, the thermal barrier coating may have a thermal conductivity of about two watt per meter kelvin.

In another refinement, a thickness of the thermal barrier coating may be between about 0.05 millimeters and about 0.51 millimeters.

In another refinement, a thickness of the thermal barrier coating may be between about 0.12 millimeters and about 0.25 millimeters.

In another refinement, the tip of the fan blade may be configured to engage in a rub event with an abradable material lining an inner surface of a fan case of the gas turbine engine.

In another refinement, the abradable material may comprise an epoxy adhesive having a thermal conductivity of less than about 0.1 watt per meter kelvin.

In accordance with another aspect of the present disclosure, a gas turbine engine is disclosed. The gas turbine engine may comprise a core engine which may include a compressor section, a combustor, and a turbine section. The gas turbine engine may further comprise a fan section located upstream of the core engine. The fan section may comprise a fan having fan blades extending from a hub. At least one of the fan blades may comprise a body portion formed from aluminum or an aluminum alloy, and the body portion may include a pressure side, a suction side, a leading edge, a trailing edge, and a tip. A coating may be applied to the tip and it may have a thermal conductivity of no more than 10 watt per meter kelvin. The fan section may further comprise a fan case including a circumferentially-extending wall surrounding the fan blades and having an abradable material lining an inner surface of the wall. The abradable material may be located radially outward from the tips of the fan blades.

In another refinement, the coating may be a thermal barrier coating comprising yttria-stabilized zirconia.

In another refinement, the at least one of the fan blades may further comprise a polyurethane coating applied to a surface of the body portion.

In another refinement, the gas turbine engine may be a geared turbofan engine.

In another refinement, the thermal barrier coating may have a thermal conductivity of about two watt per meter kelvin.

In another refinement, a thickness of the thermal barrier coating may be between about 0.05 millimeters and about 0.51 millimeters.

In another refinement, a thickness of the thermal barrier coating may be between about 0.12 millimeters and about 0.25 millimeters.

In another refinement, the fan blade may further comprise an aluminum oxide coating applied over the thermal barrier coating.

In accordance with another aspect of the present disclosure, a method for fabricating a fan blade of a gas turbine engine is disclosed. The method may comprise forming the fan blade from aluminum or an aluminum alloy, and the fan blade may have a body portion including a pressure side, a suction side, a leading edge, a trailing edge, and a tip. The method may further comprise applying a first coating on a surface of the body portion, and applying a second coating to the tip of the fan blade. The second coating may have a thermal conductivity of no more than about 10 watt per meter kelvin.

In another refinement, the first coating may be a polyurethane coating, and the second coating may be a thermal barrier coating comprising yttria-stabilized zirconia.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with certain types of gas turbine engines. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
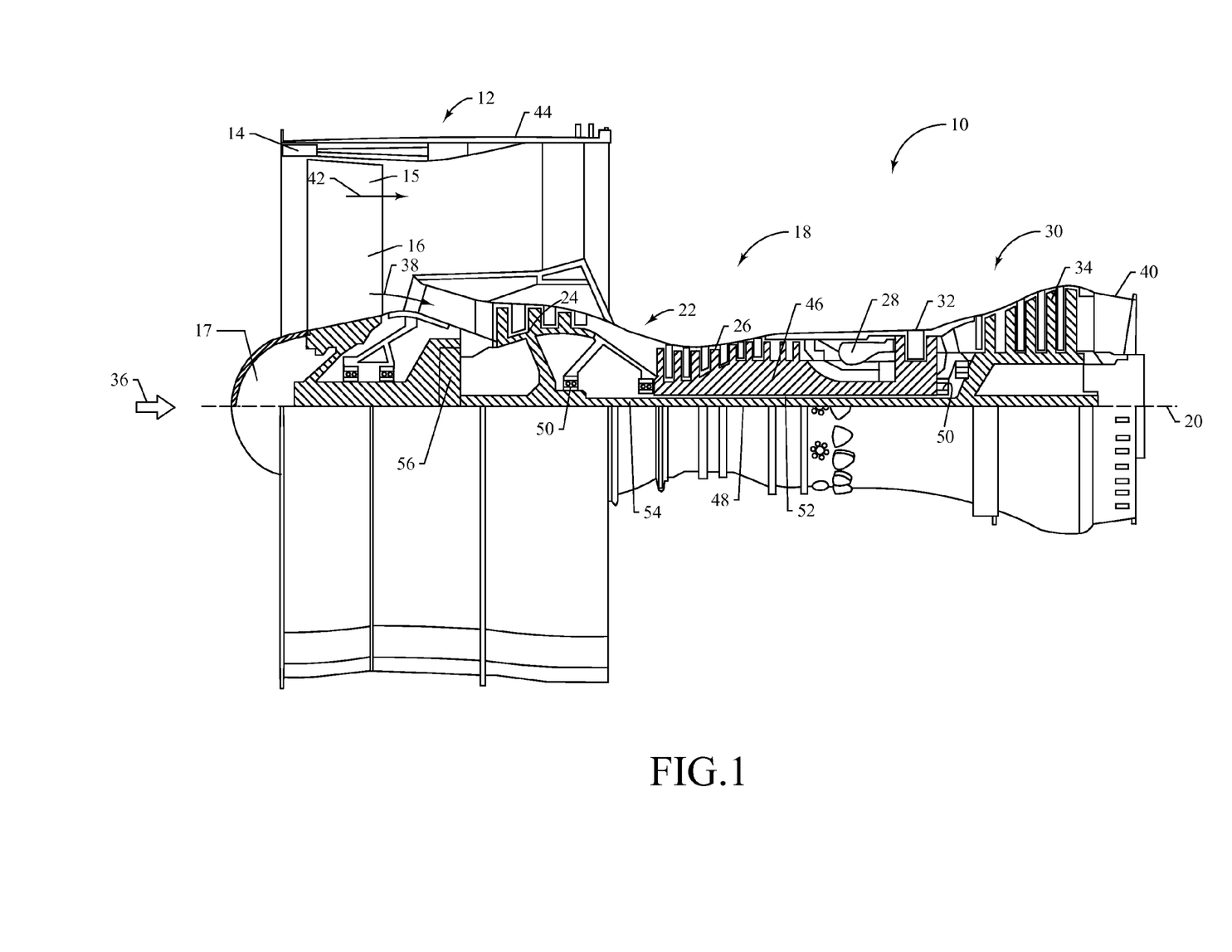
FIG. 1 is side, partially cross-sectioned view of a gas turbine engine, constructed in accordance with the present disclosure.

Referring now to the drawings, and with specific reference to FIG. 1, a gas turbine engine 10 is depicted. It may be used to provide thrust for various aerospace applications, or it may be used to provide power for power generation applications. In general, the gas turbine engine 10 may consist of a fan section 12 including a fan case 14 having a circumferentially-extending wall surrounding a fan 15, which itself may include a plurality of blades 16 extending from a hub 17. The engine 10 may further consist of a core engine 18 located axially downstream of the fan 15 with respect to an engine central axis 20. In an axially upstream to downstream direction, the core engine 18 may include: 1) a compressor section 22 which may include a low pressure compressor (LPC) 24 and a high pressure compressor (HPC) 26, 2) an annular combustor 28 (or a series of circumferentially-spaced 'can' combustors), and 3) a turbine section 30 which may include a high pressure turbine (HPT) 32 and a low pressure turbine (LPT) 34.

In operation, air 36 may be drawn into the engine 10 and it may be accelerated by the rotating blades of the fan 15, as best shown in FIG. 1. After passing through the fan section 12, a fraction of the indrawn air 36 may be routed through a primary flow pathway 38 defined by the core engine 18, as shown. In the primary flow pathway 38, the air 36 may first be compressed/pressurized in the LPC 24 and the HPC 26 of the compressor section 22, and it may then enter the combustor(s) 28 where it may be mixed with fuel and combusted to generate hot combustion gases. The hot combustion gases may then expand through and drive the rotation of the HPT 32 and the LPT 34 which may, in turn, drive the rotation of the fan 15 and the compressor section 22, as all may be interconnected through one or more shafts (see further details below). The gases may then be exhausted through an exhaust nozzle 40 to provide a fraction of forward thrust to an associated aircraft. Additional forward thrust may be provided by air exiting the engine 10 from a bypass pathway 42 defined by a bypass duct located between the core engine 18 and a nacelle 44.

The engine 10 may be a geared turbofan engine that may include a high speed spool 46 and a low speed spool 48 which may rotate about the engine central axis 20 with the assistance of bearings 50. The high speed spool 46 may include an outer shaft 52 which may connect the HPC 26 to the HPT 32, while the low speed spool 48 may include an inner shaft 54 which may connect the fan 15 and the LPC 24 to the LPT 34. The inner shaft 54 may drive the fan 15 through a speed changing device, such as a gearbox 56, in order to drive the fan 15 at a lower rotational speed than the low speed spool 48. Although the gas turbine engine 10 is shown in FIG. 1 as a two spool turbofan engine, it will be understood that the engine 10 may have other architectures as well, such as a three-spool turbofan with an intermediate pressure compressor section and an intermediate pressure turbine section. Other possible configurations include direct drive engines that do not decouple the rotation of turbine section 30 from the fan 15 and exclude a gearbox 56.

Figures 2, 3, 4:
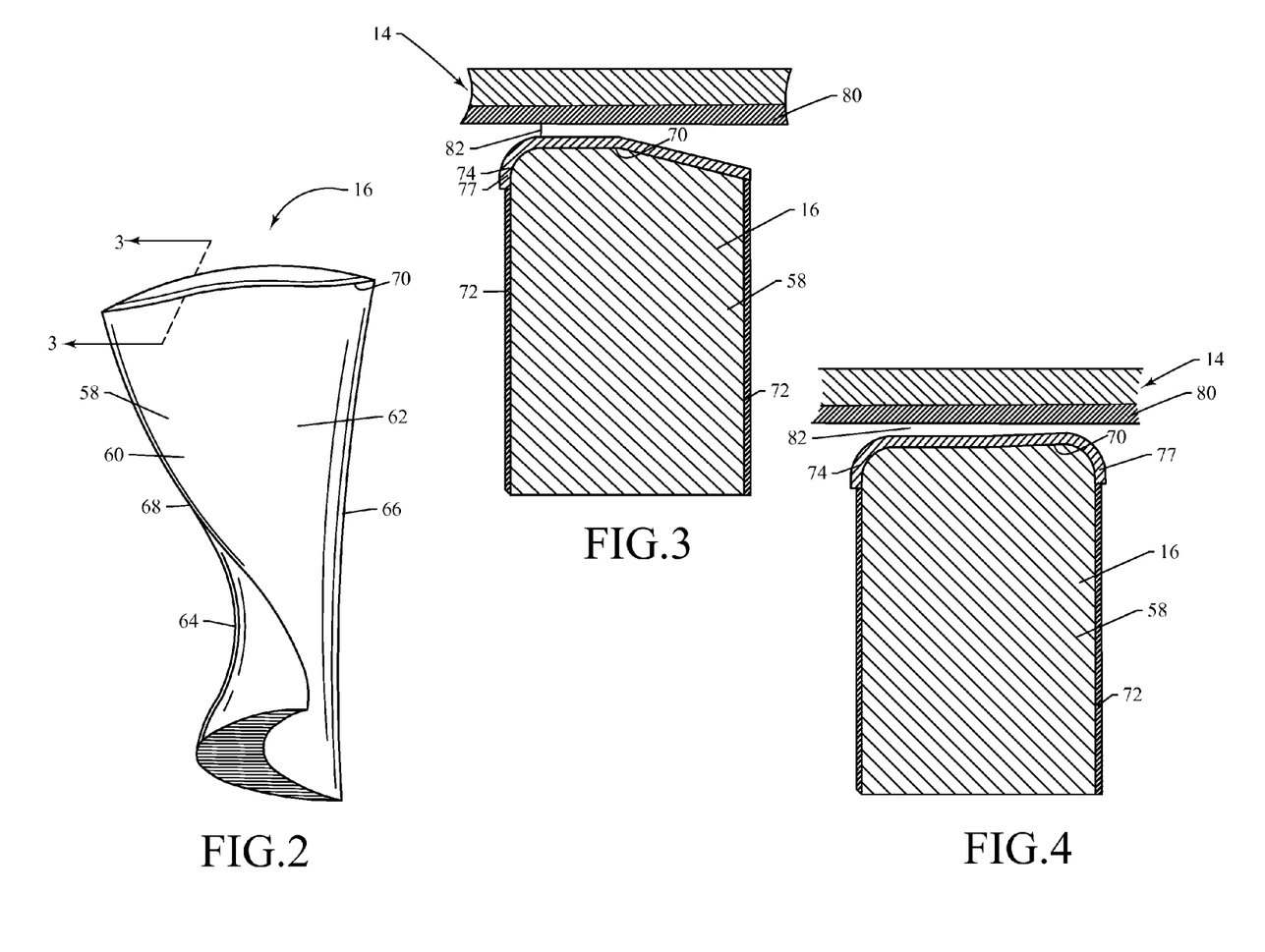
FIG. 2 is perspective view of a fan blade of the gas turbine engine of FIG. 1, constructed in accordance with the present disclosure.
FIG. 3 is a cross-sectional view of the fan blade of FIG. 2 taken along the line 3-3 of FIG. 2, depicting a clearance between a tip of the fan blade and an abradable material lining an inner surface of a fan case of the gas turbine engine, constructed in accordance with the present disclosure.
FIG. 4 is a cross-sectional view similar to FIG. 3, but with the fan blade having a flat tip, constructed in accordance with the present disclosure.

Referring now to FIGS. 2-3, a single fan blade 16 of the fan 15 is shown. The fan blade 16 may include a body portion 58 formed in the shape of an airfoil 60 which may be solid or hollow, or may have one or more hollow cavities formed therein. The body portion 58 may be connected to or be integrally formed with a root portion (not shown) which may insert in the hub 17 of the fan 15 (see FIG. 1). In addition, it may be formed from aluminum, an aluminum alloy, or another suitable material or metallic composition, and it may include a pressure side 62, a suction side 64, a leading edge 66, a trailing edge 68, and a tip 70 which may be bent (FIG. 3) or flat (FIG. 4). It may further include a polyurethane coating 72 applied to a surface of the body portion 58 to assist in protecting the fan blade 16 against corrosion or erosion (see FIG. 3). However, the fan blade 16 may have another type of coating or it may lack a polyurethane coating as well. Optionally, the fan blade 16 may further include a protective sheath, such as, but not limited to, a titanium sheath, attached to the leading edge 66 (not shown).

Notably, the fan blade 16 may also have a coating 74 applied to at least a portion of the tip 70, as best shown in FIGS. 3 and 4. For example, the coating 74 may cover the entire tip 70 of the blade 16, as shown. The coating 74 may have a thermal conductivity that is less than the thermal conductivity of an aluminum oxide ($Al_2O_3$) hard coating of the prior art (i.e., about 30 watt per meter kelvin (W/m·K)). For example, the coating 74 may have a thermal conductivity that is no more than about 10 W/m·K. As a non-limiting possibility, the coating 74 may be a thermal barrier coating 77 that is formed from a ceramic material such as zirconium dioxide ($ZrO_2$) stabilized with yttrium oxide ($Y_2O_3$) (i.e., yttria-stabilized zirconia). In this case, the thermal barrier coating 77 may have a thermal conductivity that is no more than about 2-3 W/m·K. Furthermore, the thermal barrier coating may have a thickness ranging from about 0.002 inches to about 0.02 inches (or from about 0.05 millimeters to about 0.51 millimeters) (see further details below). As another possibility, the thermal barrier coating 77 may have a thickness ranging from about 0.005 inches to about 0.01 inches (or from about 0.12 millimeters to about 0.25 millimeters).

Located radially outward of the tip 70 of the fan blade 16 may be an abradable material 80 which may line an inner surface of the fan case 14. More particularly, the abradable material 80 may surround and circumscribe the tips 70 of all of the fan blades 16 of the fan section 12. The abradable material 80 may consist of an epoxy material, such as Scotch-Weld® EC-3524 which is two-part flame retardant epoxy adhesive sold by 3M® Corporation headquartered in Saint Paul, Minn. In addition, it may have a thermal conductivity of less than about 0.1 W/m·K.

Figure 5:
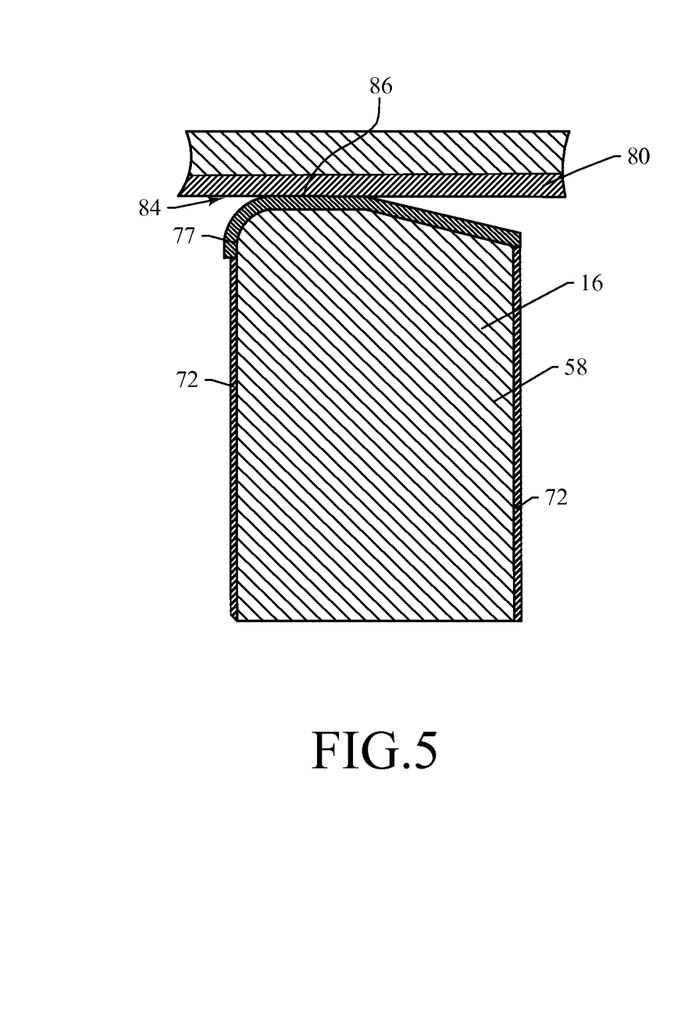
FIG. 5 is a cross-sectional view similar to FIG. 3, but depicting a rub event between a thermal barrier coating on the tip of the fan blade and the abradable material, constructed in accordance with the present disclosure.

The engine 10 may be initially assembled with a clearance 82 between the tip(s) 70 of the fan blades 16 and the abradable material 80, as shown in FIGS. 3 and 4. During an initial "break-in" period when the engine 10 starts to run, thermal or centrifugal forces may cause the fan blades 16 to expand in size such that the tips 70 of the fan blades 16 may impact or cut into the abradable material 80 in a rub event 84 (see FIG. 5). As another possibility, a rub event 84 may also occur due to the fan blade(s) 16 impacting or cutting into the abradable material 80 during take-off, a hard landing, or a maneuver/sharp turn. The rub event 84 may lead to the generation of friction heat at a rub interface 86 between the thermal barrier coating 77 and the abradable material 80. As the thermal barrier coating 77 may have a lower thermal conductivity than aluminum oxide hard coatings of the prior art, it may reduce the amount of heat that is transferred to the thermal barrier coating 77 and through the body portion 58 of the fan blade 16 as a result of a rub event 84. In this way, the thermal barrier coating 77 may assist in reducing the magnitude of the temperature rise through the body portion 58 of the fan blade 16 that may occur as a result of rub events 84. Moreover, depending on its thickness, the thermal barrier coating 77 may assist in maintaining the temperature of the body portion 58 below the temperature limit of the polyurethane coating (about 400° F.) (see further details below).

Figure 6:
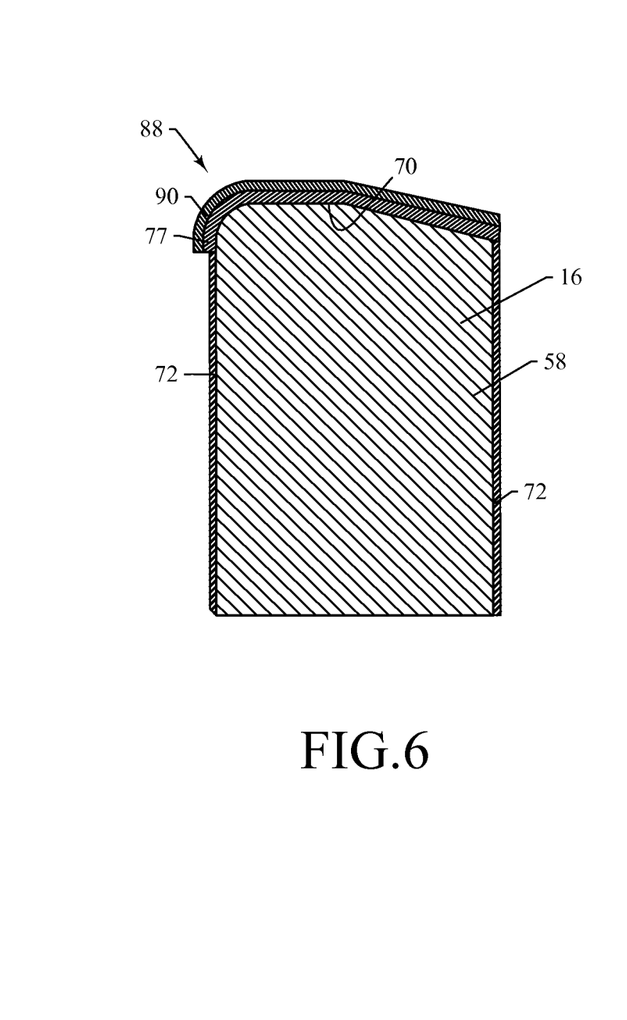
FIG. 6 is a cross-sectional view of the fan blade of FIG. 3, but with an aluminum oxide hard coat applied over the thermal barrier coating, constructed in accordance with the present disclosure.

Turning now to FIG. 6, a dual coating 88 may be applied to the tip 70 of the fan blade 16 if additional wear resistance is desired. The dual coating 88 may consist of the thermal barrier coating 77 applied to the tip 70, and a hard coating 90 applied over the thermal barrier coating 77. The thermal barrier coating 77 may be formed from yttria-stabilized zirconia, and the hard coating 90 may consist of anodized aluminum ($Al_2O_3$) or another suitable wear resistant material. In this arrangement, the thermal barrier coating 77 may act to at least partially insulate the body portion 58 from temperature spikes caused by rub events 84, while the hard coating 90 may provide wear resistance. With increased wear resistance, the tip 70 may more easily cut into the abradable material 80 during a rub event, ultimately reducing the amount of heat generated at the rub interface 86 as a result of the rub event. The reduced heat generation may further protect the polyurethane coating 72 from reaching above-tolerance temperatures.

Figure 7:
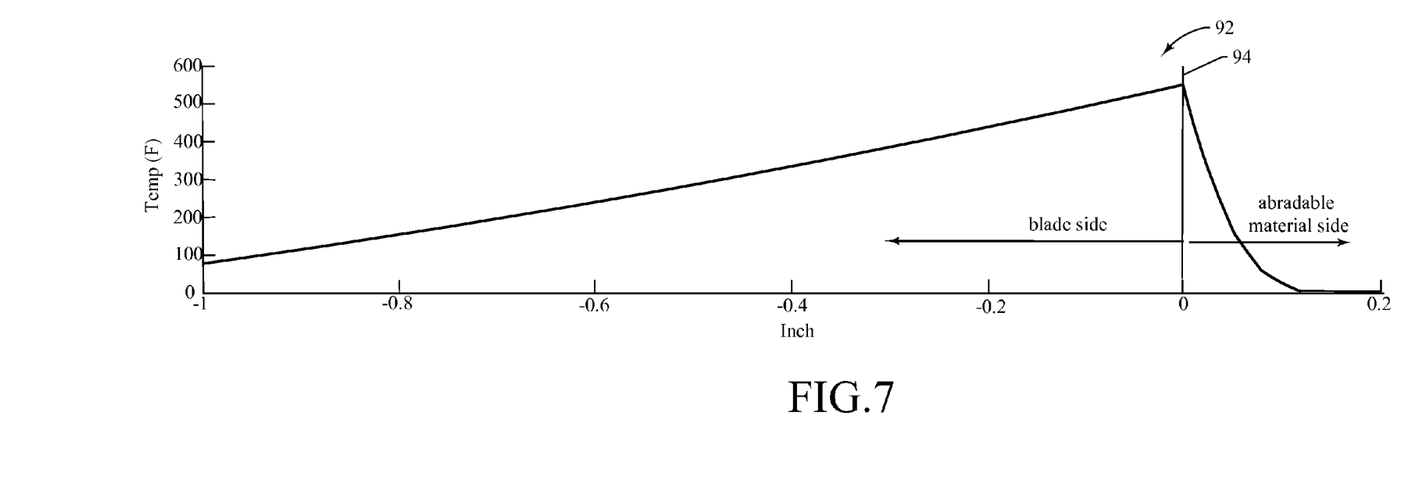
FIG. 7 is a temperature distribution plot showing a distribution of temperature between a body portion of a fan blade and an abradable material in a modeled rub event when the tip of the fan blade is coated with an aluminum oxide hard coat of the prior art.
Figure 8:
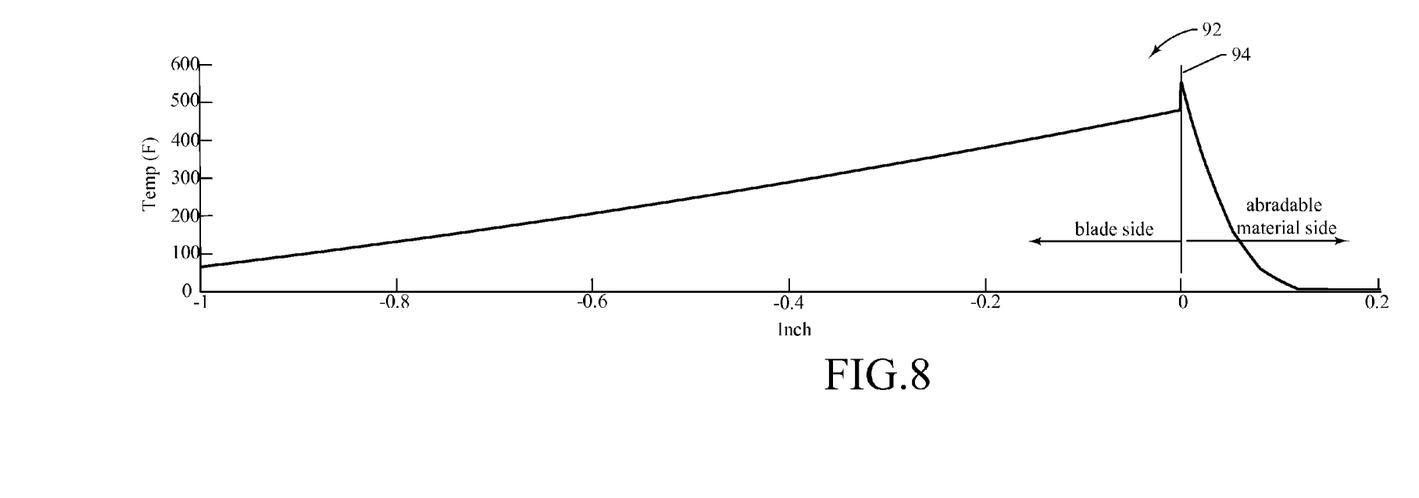
FIG. 8 is a temperature distribution plot showing a distribution of temperature between a body portion of a fan blade and an abradable material in a modeled rub event when the tip of the fan blade is coated with the thermal barrier coating of the present disclosure.

FIGS. 7-8 show the temperature distribution through the body portion of the fan blade and through the abradable material at the instant of a modeled rub event 92 at a rub interface 94 when an aluminum oxide hard coating of the prior art is applied to a tip of an aluminum fan blade (FIG. 7), and when the thermal barrier coating 77 (i.e., yttria-stabilized zirconia) of the present disclosure is applied to a tip of an aluminum fan blade (FIG. 8). The temperature distribution plots shown in FIGS. 7-8 were calculated using fixed rub event parameters (i.e., fan blade rotation speed, etc.) and the known thermal conductivities of aluminum oxide and yttria-stabilized zirconia. In addition, the calculations were made using a coating thickness of 0.002 inches (or about 0.0508 mm). As can be seen from the graphs, under identical rub event conditions and coating thicknesses, the temperature on the blade side of the rub interface 94 in the fan blade having the thermal barrier coating 77 is significantly reduced compared to the temperature on the blade side of the rub interface 94 in the fan blade having the aluminum oxide hard coating of the prior art. Without wishing to be bound to a particular theory, applicants attribute the reduced temperature in the fan blade with the thermal barrier coating 77 to the lower thermal conductivity of the thermal barrier coating 77 which reduces the transfer of heat from the rub interface 94 into the body of the fan blade.

Figure 9:
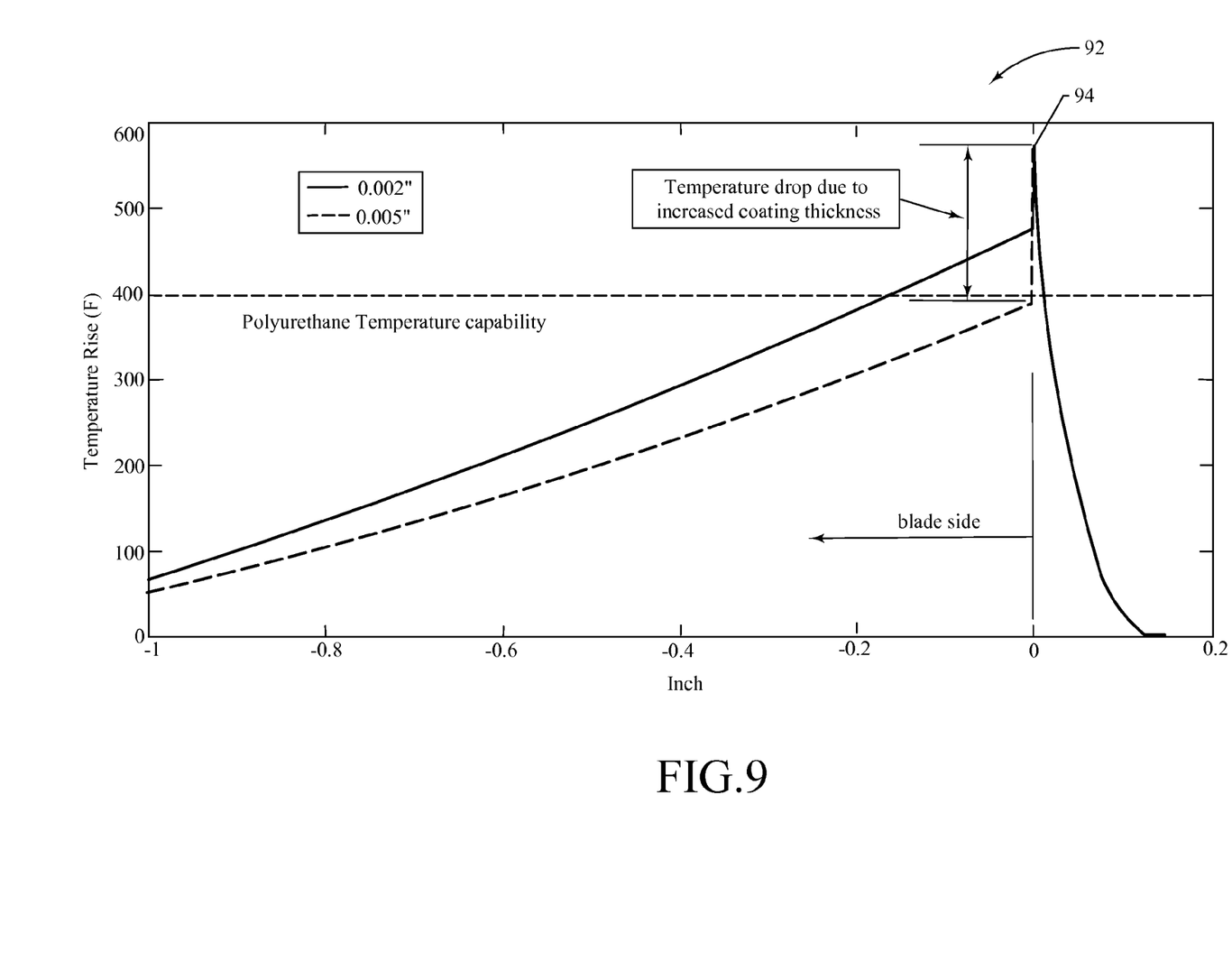
FIG. 9 are overlaid temperature distribution plots showing a change in the distribution of temperature through the body portion of the fan blade in a modeled rub event upon varying a thickness of the thermal barrier coating.
Figure 10:
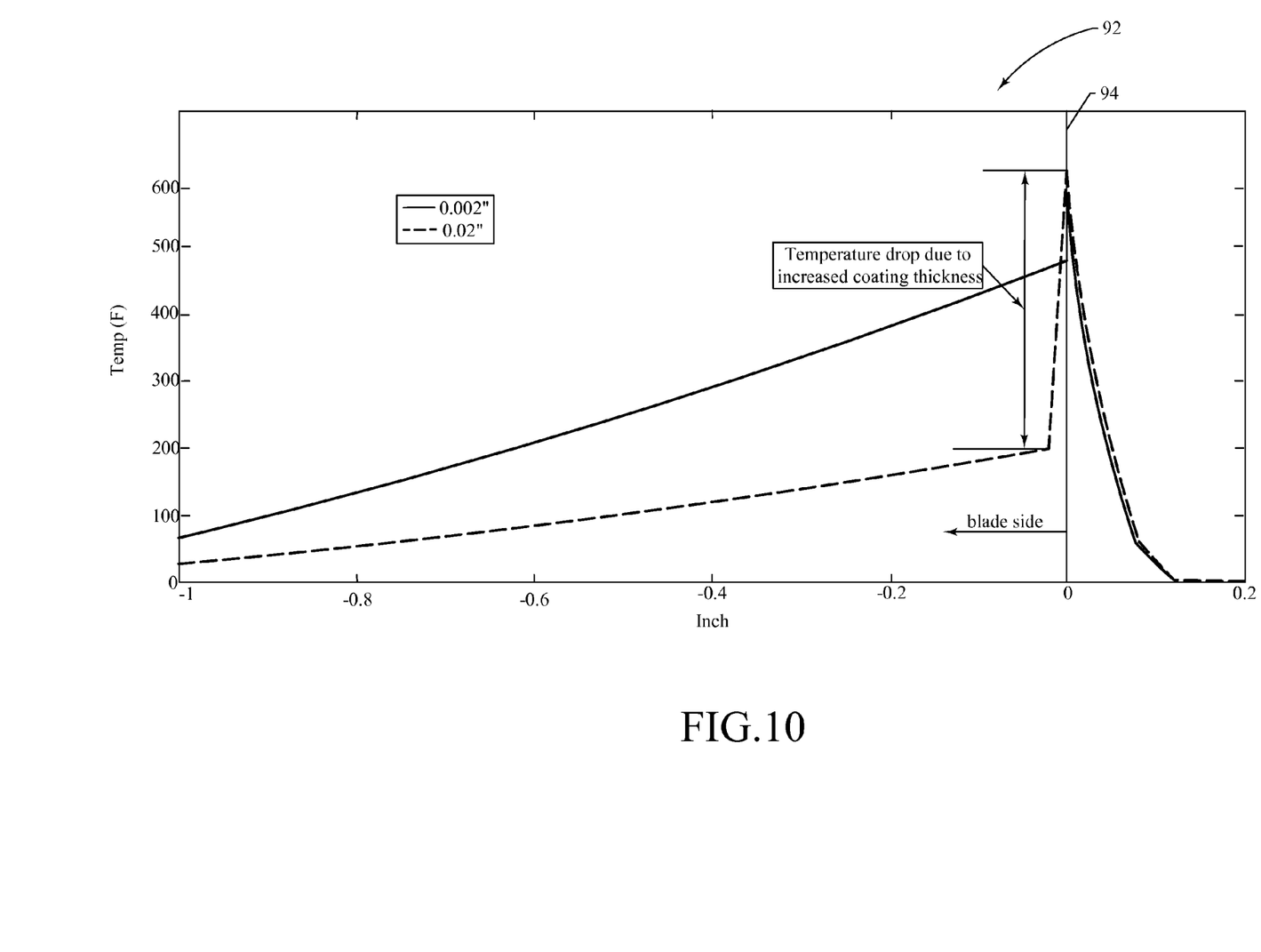
FIG. 10 are overlaid temperature distribution plots showing a change in the distribution of temperature through the body portion of the fan blade in a modeled rub event upon varying a thickness of the thermal barrier coating.

FIGS. 9-10 are temperature distribution plots showing a change in temperature distribution through the body portion 58 of the fan blade 16 at the instant of a modeled rub event 92 upon varying the thickness of the thermal barrier coating 77. Like the temperature distribution plots shown in FIGS. 7-8, the plots shown in FIGS. 9-10 are the results of model calculations that rely on a specified coating thickness, the known thermal conductivity of the thermal barrier coating 77, as well as fixed rub event parameters (i.e., fan blade rotation speed, etc.). Remarkably, FIG. 9 shows that the temperature through the body portion 58 of the fan blade 16 at the instant of the modeled rub event 92 may be reduced to below 400° F. (the temperature capability of the polyurethane coating 72) when the thermal barrier coating 77 thickness is increased from 0.002 inches (or about 0.0508 mm) to 0.005 inches (or about 0.127 mm). In addition, FIG. 10 shows a more dramatic drop in the temperature through the body portion 58 of the fan blade 16 upon increasing the thickness of the thermal barrier coating from 0.002 inches (or about 0.0508 mm) to 0.02 inches (or about 0.508 mm). Based on these results, thermal barrier coating thicknesses sufficient to maintain the temperature of the fan blade below 400° F. may range from about 0.127 mm to about 0.508 mm.

Figure 11:
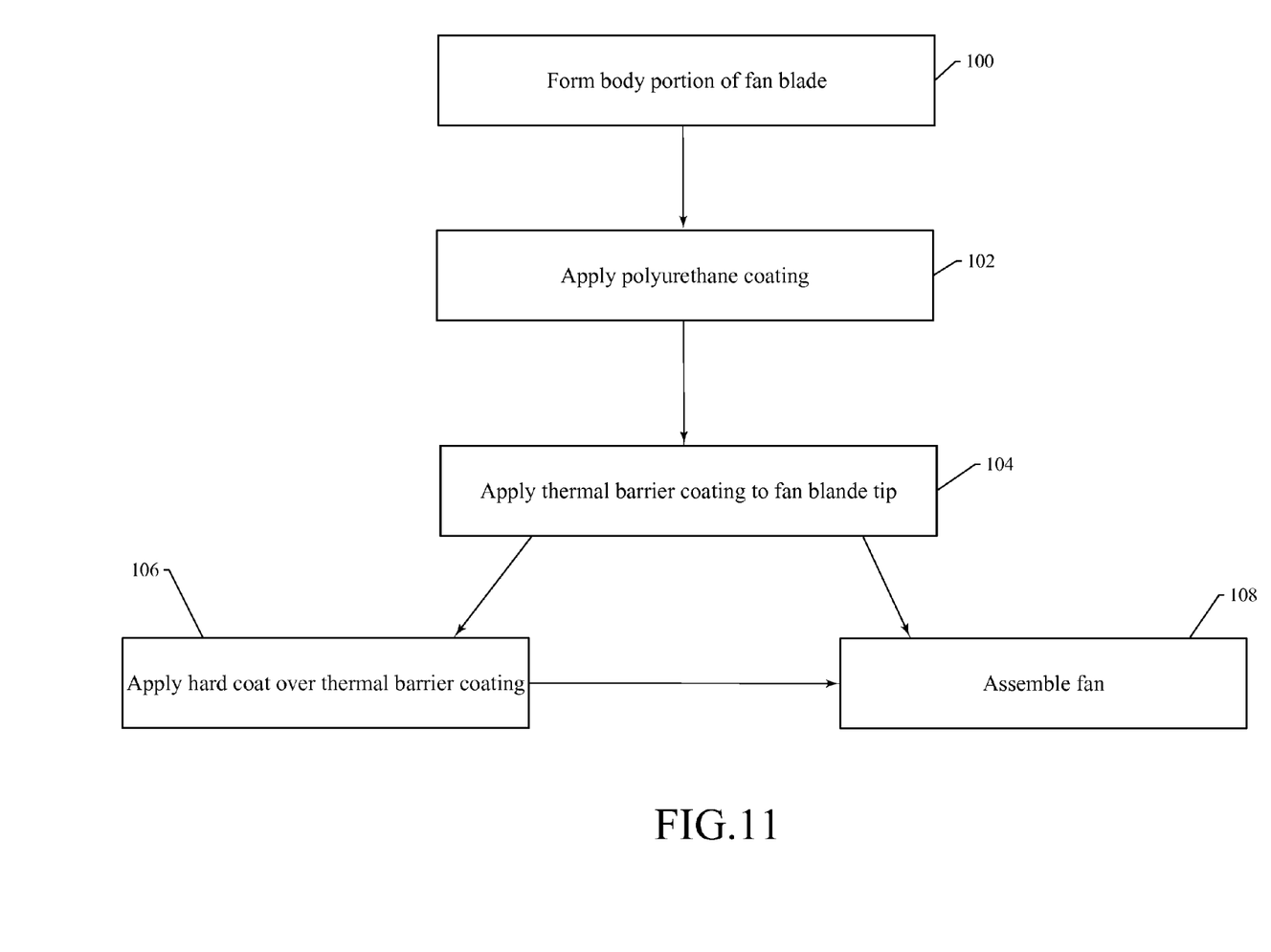
FIG. 11 is a flow chart illustrating a sample sequence of steps which may be involved in fabricating the fan blade of FIGS. 3-5, in accordance with a method of the present disclosure.

A series of steps that may be involved in fabricating the fan blade 16 of the present disclosure are shown in FIG. 11. Beginning with a first block 100, the body portion 58 of the fan blade 16 may be formed from aluminum or an aluminum alloy by a method selected by a skilled artisan such as, but not limited to, casting, machining, and/or a metal forging process. The polyurethane coating 72 may then be applied to a surface of the body portion 58 according to a next block 102. The polyurethane coating 72 may be applied using any suitable method apparent to those skilled in the art such as, but not limited to, spray coating. As one possibility, the polyurethane coating 72 may be applied on the pressure side 62, the suction side 64, the leading edge 66, and the trailing edge 68 of the body portion 58. In some cases, the polyurethane coating 72 may be applied to the tip 70 as well. If desired, a protective sheath such as a titanium sheath may be adhesively bonded or otherwise attached to the leading edge 66 either prior to or after the block 102.

According to a next block 104, the thermal barrier coating 77 may be applied to the tip 70 of the fan blade using any suitable method such as, but not limited to, plasma spraying or thermal spraying. In some cases, masking may be used to block certain surfaces of the fan blade 16 from application of the thermal barrier coating 77. If desired, a machining or grinding process may be used to smoothen out the surface of the thermal barrier coating 77 after the block 104. In addition, the thickness of the thermal barrier coating 77 may be adjusted as desired during the block 104 according to the anticipated temperature ranges that will be experienced by the fan blade 16 in use, as the resistance of the fan blade 16 to temperature spikes caused by rub events may increase with increasing thickness of the thermal barrier coating 77 (see FIGS. 9-10 above).

Optionally, the hard coating 90 may be applied on top of the thermal barrier coating 77 to provide the dual coating 88 with enhanced wear resistance (optional block 106). The block 106 may be carried out by spraying an aluminum oxide coating over the thermal barrier coating 77, or by anodizing an aluminum coating applied over the thermal barrier coating 77 as will be understood by those with ordinary skill in the art. However, other suitable application methods selected by a skilled artisan may also be used. Following the block 104 (or the block 106), fan blades 16 fabricated by the method of FIG. 11 may be assembled to provide the fan 15 according to methods apparent to those with ordinary skill in the art (block 108).

INDUSTRIAL APPLICABILITY

In general, it can therefore be seen that the technology disclosed herein has industrial applicability in a variety of settings including, but not limited to, geared turbofan engines and other types of gas turbine engines. The thermal barrier coating disclosed herein may have a thermal conductivity that is at least ten times lower than the thermal conductivity of aluminum oxide coatings of the prior art. As such, the thermal barrier coating may be applied to a tip of an aluminum or an aluminum-alloy based fan blade to reduce the amount of heat that is conducted into the body of the fan blade due to rub events between the fan blade tip and an abradable material lining the inner surface of the fan case. In this way, the thermal barrier coating may insulate the body of the fan blade from temperature spikes caused by rub events and may, in turn, assist in preserving the integrity of the polyurethane coating. Furthermore, the thickness of the thermal barrier coating may be adjusted as needed to assist in maintaining the temperature of the fan blade below the temperature capability of the polyurethane coating. The thermal barrier coatings disclosed herein may eliminate the need for more expensive polyurethane coatings having higher inherent temperature capabilities, and may also enable a tighter clearance between the fan blade tips and the abradable seal to allow for improved engine efficiency and performance. It is expected that the technology disclosed herein may find wide industrial applicability in a wide range of areas such as, but not limited to, aerospace technologies.

What is claimed is:

1. A fan blade for a gas turbine engine, comprising:
   a body portion formed from a metallic material, the body portion including a pressure side, a suction side, a leading edge, a trailing edge, and a tip; and
   a coating applied to the tip, the coating having a thermal conductivity of no more than 10 watt per meter kelvin,
   wherein the metallic material is aluminum or an aluminum alloy,
   wherein the coating is a thermal barrier coating comprising yttria-stabilized zirconia,
   wherein the fan blade further comprises a polyurethane coating applied to a surface of the body portion,
   wherein the thermal barrier coating has a thermal conductivity of two watt per meter kelvin, wherein the tip of the fan blade is configured to engage in a rub event with an abradable material lining an inner surface of a fan case of the gas turbine engine, wherein the abradable material comprises an epoxy adhesive having a thermal conductivity of less than 0.1 watt per meter kelvin.

2. The fan blade of claim 1, wherein the fan blade further comprises an aluminum oxide coating applied over the thermal barrier coating.

3. The fan blade of claim 1, wherein a thickness of the thermal barrier coating is between 0.05 millimeters and 0.51 millimeters.

4. The fan blade of claim 1, wherein a thickness of the thermal barrier coating is between 0.12 millimeters to 0.25 millimeters.

5. A gas turbine engine, comprising:
a core engine including a compressor section, a combustor, and a turbine section; and
a fan section located upstream of the core engine and comprising:
  a fan including fan blades extending from a hub, each of the fan blades comprising:
    a body portion formed from aluminum or an aluminum alloy and including a pressure side, a suction side, a leading edge, a trailing edge, and a tip, and
    a coating applied to the tip and having a thermal conductivity of no more than 10 watt per meter kelvin, and
  a fan case including a circumferentially-extending wall surrounding the fan blades and having an abradable material lining an inner surface of the wall, the abradable material being located radially outward from the tips of each of the fan blades,
wherein the metallic material is aluminum or an aluminum alloy,
wherein the coating is a thermal barrier coating comprising yttria-stabilized zirconia,
wherein each fan blade further comprises a polyurethane coating applied to a surface of the body portion,
wherein the thermal barrier coating has a thermal conductivity of two watt per meter kelvin,
wherein the tip of each fan blade is configured to engage in a rub event with an abradable material lining an inner surface of a fan case of the gas turbine engine,
wherein the abradable material comprises an epoxy adhesive having a thermal conductivity of less than 0.1 watt per meter kelvin.

6. The gas turbine engine of claim 5, wherein the gas turbine engine is a geared turbofan engine.

7. The gas turbine engine of claim 5, wherein a thickness of the thermal barrier coating is between 0.05 millimeters to 0.51 millimeters.

8. The gas turbine engine of claim 5, wherein a thickness of the thermal barrier coating is between 0.12 millimeters and 0.25 millimeters.

9. The gas turbine engine of claim 5, wherein the fan blade further comprises an aluminum oxide coating applied over the thermal barrier coating.

10. A method for fabricating a fan blade of a gas turbine engine, comprising:
forming the fan blade from aluminum or an aluminum alloy, the fan blade having a body portion including a pressure side, a suction side, a leading edge, a trailing edge, and a tip;
applying a first coating on a surface of the body portion; and
applying a second coating to the tip of the fan blade, the second coating having a thermal conductivity of no more than 10 watt per meter kelvin,
wherein the second coating is a thermal barrier coating comprising yttria-stabilized zirconia,
wherein the coating is a polyurethane coating,
wherein the thermal barrier coating has a thermal conductivity of two watt per meter kelvin,
wherein the tip of each fan blade is configured to engage in a rub event with an abradable material lining an inner surface of a fan case of the gas turbine engine,
wherein the abradable material comprises an epoxy adhesive having a thermal conductivity of less than 0.1 watt per meter kelvin.

* * * * *